R. A. WEAGANT.
MEANS FOR GENERATING ELECTRICAL OSCILLATIONS.
APPLICATION FILED APR. 9, 1914.

1,384,108.  Patented July 12, 1921.

Witnesses:
C. S. Ashley
M. S. MacIntyre

Inventor:
ROY A. WEAGANT
By his Attorneys
Sheffield Beatty Betts

UNITED STATES PATENT OFFICE.

ROY A. WEAGANT, OF ROSELLE PARK, NEW JERSEY, ASSIGNOR, BY MESNE ASSIGNMENTS, TO RADIO CORPORATION OF AMERICA, A CORPORATION OF DELAWARE.

MEANS FOR GENERATING ELECTRICAL OSCILLATIONS.

1,384,108.   Specification of Letters Patent.   Patented July 12, 1921.

Application filed April 9, 1914. Serial No. 830,584.

*To all whom it may concern:*

Be it known that I, ROY A. WEAGANT, a citizen of the United States, and a resident of Roselle Park, in the county of Union, State of New Jersey, have invented certain new and useful Improvements in Means for Generating Electrical Oscillations, of which the following is a specification.

The object of my invention is to produce means for generating electrical oscillations by means of a gaseous conducting medium which shall be small, simple and relatively cheap, shall have no moving parts, shall have reliable adjustments and be adapted to work continuously without attention.

These oscillations are capable of a variety of uses. They may be used for wireless or wire telegraphy or telephony, or any other purpose for which such oscillations may be found useful.

In the drawing accompanying this specification I have illustrated one of the many applications of my invention, the illustration being in connection with wireless telegraphy. This illustration is intended primarily to show an operative structure in which my new means of obtaining electrical oscillations are used, and is not to be understood as showing the only form or manner in which my invention may be used.

Figure 1:
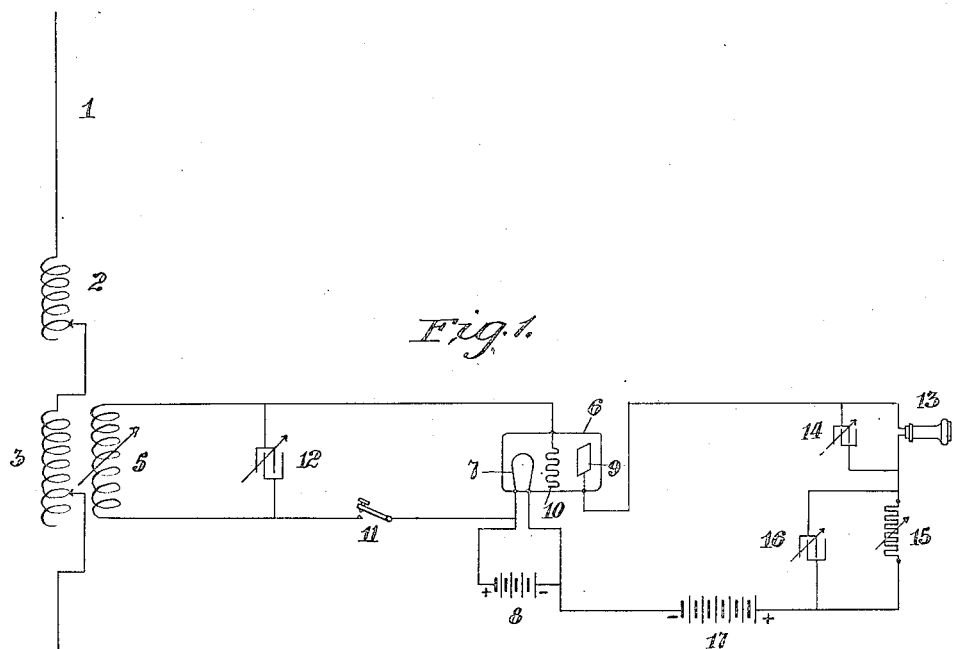
Figure 1 shows diagrammatically one embodiment of the complete system.

Referring to the drawings and particularly to Fig. 1, these show my invention as applied to the transmitting station of a wireless telegraph system, the aerial is shown at 1, the aerial tuning inductance at 2, the primary of a transformer at 3, the aerial being earthed at 4, as usual, connected to the aerial by means of the secondary 5 of a transformer, or any equivalent means, is a circuit which includes a vessel 6. This vessel 6 may be a sealed vessel preferably of glass or similar material inclosing a plurality of conducting elements or electrodes separated by a conducting gaseous medium. Rarefied air or any other suitable medium may be used, such for instance as mercury vapor. The use of these substances involves no change in the apparatus. In the particular embodiment shown the vessel incloses a hot element 7 in the form of a filament, which is heated by any convenient source of heat such as a battery or other source of current 8, a cold element 9 in the form of a plate, and a second cold element 10, which is preferably in the form of a grid or spiral of wire. The filament is preferably formed of a substance adapted to give up a copious supply of corpuscles when heated to incandescence. The cold elements 9 and 10 may be formed of nickel or any other suitable material and are not necessarily of the particular form shown.

The terminals of the secondary 5 of the transformer are preferably connected one to the grid element 10 and the other, through a key 11, to the hot element 7. Across the terminals of secondary 5 a variable condenser 12 may be connected so that a resonant circuit may be established through the condenser and secondary 5 of the transformer.

Attached to two of the conducting elements, preferably the hot element 7 and the cold element 9, is a local circuit, which may for convenience be called the energizing circuit. A telephone or other indicating instrument 13 which is used to ascertain the correctness of the adjustments may be included in the energizing circuit. This telephone is preferably shunted by a condenser 14 which provides a convenient adjustment. In series with the telephone a relatively high variable resistance 15 may be placed, which resistance is shunted by a variable condenser 16. Although I prefer to include resistance 15 in the energizing circuit, it is not necessary to the operation of my device. In series with the resistance is a relatively powerful battery or other source of electric current 17, which furnishes the energy for the production of oscillations in vessel 6.

As thus connected, my device generates electric oscillations which are impressed upon the aerial through the inductive coupling, 3, 5 upon the closing of the key 11, thus producing signals.

In operating my device the hot member 7 is first brought to an incandescent condition. The voltage of the battery 17 is then adjusted until a high note is heard in the telephone 13, after which condenser 14, or condenser 16, or both, are varied until the note is no longer heard in the telephone. A faint blue glow is then usually observable in the vessel, which I believe to indicate that ionization of the gas contained therein has set in. The inductance 5 and the condenser 12 are then adjusted until the values are such as to produce the desired wave length. The aerial circuit 1, 2, 3, 4, is then adjusted until it is in tune with the oscillations being produced by the generating means. The signals are produced by opening and closing key 11 or in any other well known manner, after the proper adjustments of the generating means have been obtained.

An important advantage of my device consists in the fact that in its operation a very small variation of the current passing through the hot element 7 creates a large variation of the current delivered to the aerial. In a similar manner a small potential variation between the plate element 9 and the hot element 7 also causes a very large variation of the current delivered to the aerial. Thus, these large currents are made subject to the control of very small quantities, which may easily be controlled by apparatus unable to control large quantities of current or voltage as, for instance, a telephone or similar device.

Figure 2:
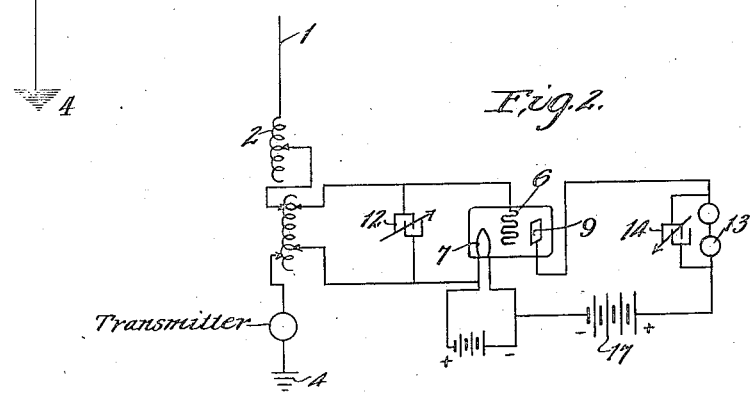
Fig. 2 shows a system of the same general kind in which some of the details have been varied.

It is obvious that the specific arrangement illustrated, wherein my improved means for generating electrical oscillations is used, may be varied in a number of ways without departing from the spirit of my invention. For instance, when used for wireless telegraphy, an auto-transformer may be used instead of an inductive coupling, or other connections to the aerial may be made use of. Also, instead of using the key 11 a continuous emission of waves may be produced and their wave lengths varied by varying the inductance of the aerial in order to produce a signal. When used in wire telegraphy or telephony, any desired wire circuit may be substituted for the aerial, and when used in wireless, or wire, telephony a telephone transmitter and receiver may be introduced in one of the circuits at a convenient point. Examples of such modifications are illustrated in Fig. 2, which shows the circuits adapted to be used either for receiving or transmitting in a wireless telephone system. I have not described the exact method of making all of these modifications and applications of my device and the many others which might be made, since they can be readily made in manners which will be understood by those skilled in the art.

What I claim is:

1. An oscillation generator system including a sealed evacuated vessel in which oscillations are generated, said vessel inclosing three electrodes, means for maintaining current through one of said electrodes, two circuits exterior to said vessel and connected each between two of said electrodes, one of said circuits containing an electrode not in the other circuit and including a source of continuous current causing the production of oscillations in said vessel, and one of said circuits containing sufficient ohmic resistance to materially and favorably affect the production of oscillations.

2. Means for generating electrical oscillations comprising an oscillation generating circuit, an energizing circuit comprising a battery and a non-inductive resistance, and means for adjusting said resistance, the said circuits being connected through a sealed vessel inclosing a plurality of elements separated by a conducting gaseous medium.

3. Means for generating electrical oscillations comprising an oscillation generating circuit, an energizing circuit containing a source of energy in series with a non-inductive resistance, associated with the generating circuits through a sealed vessel inclosing a plurality of elements separated by a conducting gaseous medium, and variable means in said energizing circuit for controlling the flow of current therein.

4. An oscillation generator system including a vacuum valve having a plate, grid and filament elements, and circuit connections therefor, and a non-inductive resistance connected between the filament and one of the other elements, and an output circuit for the generated oscillations.

5. Means for generating electrical oscillations comprising an oscillation generating circuit tuned to the periodicity of the oscillations it is desired to generate, an energizing circuit containing a source of energy in series with a non-inductive resistance shunted by a condenser, associated with the generating circuit through a sealed vessel inclosing a plurality of elements, and variable means in said energizing circuit for controlling the rate of flow of the current therein.

6. In an oscillation generator system, the combination with a normally oscillating audion having three terminal elements and a non-inductive resistance connected between two of the elements of the audion.

7. In an oscillation generator system, the combination with a normally oscillating audion having three electrode members and a non-inductive resistance connected between two of the electrode members.

In testimony whereof I have hereunto signed my name in the presence of two witnesses this 8th day of April, 1914.

ROY A. WEAGANT.

Witnesses:
WALTER S. JONES,
WM. M. EARL.